Feb. 25, 1964     W. B. GREENLEE ETAL     3,122,644

BINOCULAR STAR SENSING SYSTEM

Filed Sept. 15, 1951

*INVENTORS*
WILLIAM B. GREENLEE
BY    VICTOR A. MILLER

*William P. Lane*
ATTORNEY

United States Patent Office 3,122,644
Patented Feb. 25, 1964

3,122,644
BINOCULAR STAR SENSING SYSTEM
William B. Greenlee, Downey, and Victor A. Miller, Long Beach, Calif., assignors to North American Aviation, Inc.
Filed Sept. 15, 1951, Ser. No. 246,728
14 Claims. (Cl. 250—203)

This invention relates to the location of a star image in an optical field, and particularly to a binocular electronic star sensing system adapted to discriminate against sky gradient signal and to provide a signal proportional to the radius vector of a star image and a signal proportional to the azimuth of the star image within the optical field.

A system broadly related to this invention is disclosed in patent application Serial No. 173,146 for "Star Sensing System" filed July 11, 1950, now Patent No. 2,943,204, granted June 28, 1960, in the name of William B. Greenlee et al.

It is an object of this invention to provide a star sensing system which discriminates against sky gradient signal.

It is another object of this invention to provide a star sensing system adapted to yield information as to the location of a star image within an optical field.

It is another object of this invention to provide means for detecting the angular displacement of the line of sight to a celestial body from a line in space.

It is another object of this invention to provide a star sensing system adapted to yield shaft rotations proportional to the polar coordinates of a star image in an optical field.

It is another object of this invention to provide a star sensing system involving a minimum of electronic equipment.

Figure 1:
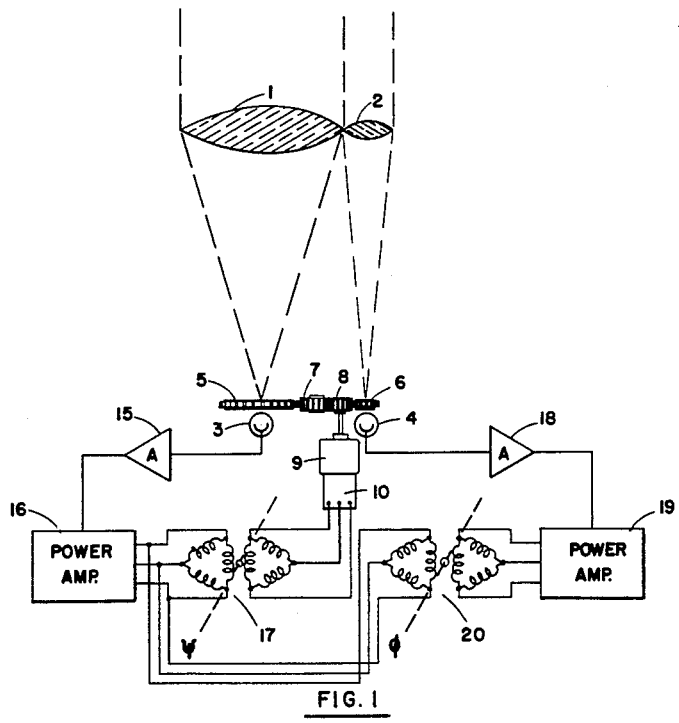
Figure 2:
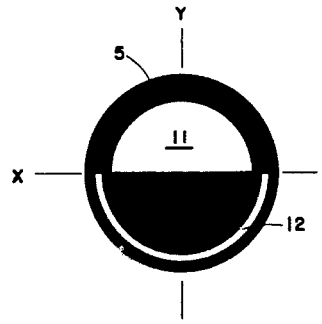
Figure 3:
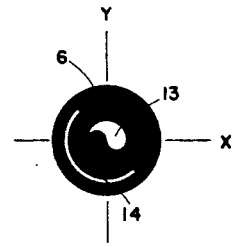

Other objects of invention will become apparent from the following description taken in connection with the accompanying drawings, in which:

FIG. 1 is a schematic drawing of the invention;
FIG. 2 is a plan view of one of the reticles of this invention; and
FIG. 3 is a plan view of another of the reticles of this invention.

Referring now to the drawings and particularly to FIG. 1, light from a star is gathered by lenses 1 and 2 and focused upon photocells 3 and 4 through reticles 5 and 6 driven by gears 7 and 8 and by motor 9 to which is attached reference generator 10. Details of reticles 5 and 6 are shown in FIGS. 2 and 3, respectively. Reticle 5, which may be referred to as a compensated half-sector disc reticle, consists of an opaque disc having transparent half-sector area 11 and compensating area 12. Reticle 6 consists of an opaque disc having transparent area 13 bounded on one side by a half circle and on the other by a curve symmetrical about the axis of rotation of reticle 6, such as two reversed arcs of circles as shown in FIG. 3 or a pair of spirals having the formulas $R=K\phi$ and $R=-K\phi$ for positive values of $\phi$ less than $$\frac{\pi}{2}$$

where R is the radius of any point on the curve, K is a constant equal to $$\frac{2r}{\pi}$$

where $r$ is the radius of the bounding half circle, and $\phi$ is the angle between the origin axis of the curve and the point at which R is located. The compensating area 14 is also transparent. Area 14 may be semiannular, as shown or may be of any other convenient shape so long as its minimum radial coordinate from the center of the disc is greater than the outside radius of area 13. It is to be noted that the centroid of the transparent areas of both reticles falls upon the axis of rotation of the reticle. This feature makes possible the elimination of the effect of the gradient of the sky background light in the vicinity of the star being followed by the device. The output of photocell 3 is connected to amplifier 15 and thence to power amplifier 16 which has a three-phase output connected to the stator of selsyn motor 17. The output of reference generator 10 is connected to the rotor of selsyn motor 17. The output of photocell 4 is connected to amplifier 18, thence to power amplifier 19, the output of which is connected to the stator of selsyn motor 20. The output of power amplifier 16 is also connected to the rotor of selsyn motor 20.

Light from a star, transmitted by a binocular system shown schematically by lenses 1 and 2, is chopped by reticles 5 and 6 and cast upon photocells 3 and 4. The chopping action of reticles 5 and 6 modulates the output of photocells 3 and 4, and the phase relationships of the constant frequency outputs thereof are an indication of the displacement radius vector of the star from the optical axis of the system. The signal produced by photocell 3 is a voltage which may be represented as proportional to sine $(\omega t+\psi)$, where $\omega$ is the angular velocity of the reticle and $\psi$ is the star image angle measured from an axis such as the X or Y axis in FIG. 2. Thus, the phase of the output of photocell 3 is directly affected by the "azimuth" of the star image in the plane of reticle 5. Likewise, the output of photocell 4 may be represented as a voltage proportional to sine $(\omega t+\psi+\phi)$, where $\phi$ is related to the radius vector or coordinate of a point on the spiral of reticle 6 according to the formula $R=K\phi$. The outputs of photocells 3 and 4 are fed through amplifiers 15 and 16 and power amplifiers 18 and 19, respectively, and thence to selsyn motors 17 and 20. The shaft position assumed by selsyn motor 17 is indicative of the phase angle between the signal input from amplifier 16 and the reference generator signal. The shaft position assumed by selsyn motor 20 is indicative of the phase angle between the signal input from amplifier 19 and amplifier 16. The shaft positions of selsyn motors 17 and 20 are therefore equal to $\psi$ and $\phi$ respectively, since R is directly proportional to $\phi$ according to the formula $R=K\phi$, and $\psi$ represents the star image angle with respect to the coordinate system shown in FIG. 2. The exact location of the star image is then given by these two shaft rotations. These two shaft rotations may be used to cause the optical system to follow the star, or may be used to provide information as to the orientation of the star with respect to the coordinates of a navigational system.

Although the invention has been described and illustrated in detail, it is to be clearly understood that the same is by way of illustration and example only and is not to be taken by way of limitation, the spirit and scope of this invention being limited only by the terms of the appended claims.

We claim:
1. Means for producing shaft rotations indicative of the polar coordinates of a star image in an optical field comprising a pair of optical systems for gathering light from a star, a rotating compensated half-sector disc reticle for chopping the light from a star gathered by one of said optical systems, a rotating compensated half-sector disc reticle the diametral boundary of which is a spiral symmetrical about its center of rotation for chopping the light from said star gathered by the other of said optical systems, means for rotating said reticles in synchronism, reference means for generating an alternating current signal in response to the rotation of said reticles, a pair of photoelectric cells responsive to light passing through each of said reticles, and a pair of differential selsyns for producing shaft rotations in response to signals from said photoelectric cells and said reference means to thereby produce shaft rotations indicative of the coordinates of the image of said star.

2. Means for producing electrical signals expressive of the magnitude and direction of the angular displacement of the line of sight to a star from the axis of an optical system comprising a pair of photoelectric cells for generating electrical signals in response to light received from a star, a pair of parallel optical systems for casting light from said star on each of said photoelectric cells, a rotatable compensated half-sector disc reticle for chopping the light received by one of said photocells, a rotatable compensated half-sector disc reticle having a spiral diametral boundary for chopping the light received by the other of said photocells, means for rotating said reticles in synchronism with each other, and reference generator means for generating an alternating current signal proportional in frequency to the rotation of said reticles whereby the relations between the signals generated by said photocells and by said reference means are expressive of the magnitude and direction of the angular displacement of the line of sight to said star fixed with respect to the optical axes of said optical systems.

3. Means for producing signals indicative of the magnitude and direction of angular deviation of the line of sight to a star from a line in space known with respect to the optical axes of an optical system comprising a pair of photocells, optical means for gathering light from a star and projecting it upon said photocells, means for modulating the light falling on one of said photocells with a phase dependent upon the magnitude of the deviation of the line of sight to said star from the optical axis of said optical means, means for modulating the light falling on the other of said photocells with a phase dependent upon the direction of deviation of the line of sight to said star from the optical axis of said optical means, and means for indicating the relative phase of said modulations to thereby produce signals indicative of the magnitude and direction of said deviation.

4. A device as recited in claim 3 in which said first-named means for modulating comprises a rotatable compensated half-sector disc reticle the diametral boundary of which is a spiral symmetrical about the axis of rotation thereof, and means for rotating said reticle at predetermined speed.

5. A device as recited in claim 3 in which said second-named means for modulating comprises a rotatable compensated half-sector disc reticle, and means for rotating said reticle at predetermined speed.

6. A device as recited in claim 3 and further comprising means responsive to the signals from said photocells for producing shaft rotations indicative of the magnitude and direction of the deviation of the line of sight to said star.

7. Means for producing electrical signals of phase dependent upon the magnitude and direction of angular deviation of the line of sight to a star comprising a pair of photocells responsive to light received from a star, optical means for gathering light from a star and casting it upon said photocells, means for modulating the light falling on the first of said photocells so that the phase of the output thereof is dependent upon the direction of said deviation, and means for modulating the light falling on the second of said photocells so that the phase of the output thereof is dependent upon the magnitude of said deviation to thereby produce electrical signals of phase dependent upon the magnitude and direction of the deviation of the line of sight to a star.

8. A device as recited in claim 7 in which said first modulating means comprises a rotatable half-sector disc reticle, means for rotating said reticle, and means including a reference alternating current generator driven by said rotating means and a selsyn motor rotated in response to said generator and said first photocell for indicating the phase of the output of said photocell to thereby produce a movement indicative of the direction of said angular deviation.

9. A device as recited in claim 7 in which said second modulating means comprises a compensated half-sector disc reticle having a predeterminately curved diametral boundary between transparent and opaque material whereby the phase of interruption of light to said photocell is a function of the magnitude of the angular deviation of the line of sight to a star from the axis of said optical means.

10. Means for determining the position of a star image in an optical field comprising a pair of photocells for receiving light from said field, a first modulating means for modulating the light received by one of said photocells with a phase dependent upon the azimuth of said star in said field, and a second modulating means for modulating the light received by the other of said photocells with a phase dependent upon the radius vector to said star in said field whereby the phase of the outputs of said photocells may be used to determine the position of the star image in said optical field.

11. In a parallel reticle system for locating a star image in an optical field means for producing a signal indicative of the magnitude of the radius vector to said star image comprising a rotatable circular opaque disc having a transparent area formed by a semicircle concentric with said disc and a curve having its origin at the center of said disc and symmetrical thereabout, and a second transparent area positioned so that the centroid of all transparent areas of said disc falls on the center of said disc, said transparent area having a minimum radial coordinate greater than the outside radius of said semicircle, means for rotating said disc in the path of the light from said star, a rotatable compensated half-sector disc disposed to interrupt the light from said star, and means for rotating said half sector disc in synchronism with said opaque disc whereby light from said field including said star is periodicaly interrupted with a relative time phase dependent upon the magnitude of said radius vector to thereby provide a signal indicative of the magnitude of said radius vector.

12. A device as recited in claim 11 and further comprising light-sensitive means for producing an alternating current signal whose phase is indicative of the radius vector to said star in said field.

13. A device as recited in claim 11 and further comprising light-sensitive means for producing a first alternating current signal in response to light passing through said disc, means for producing a second alternating current signal in response to the rotation of said half-sector disc, and means for comparing the phase of said first alternating current signal with the phase of said second alternating current signal to thereby produce a movement indicative of said radius vector.

14. In an optical system for locating a star in an optical field, means for modulating the light from a star with a relative time phase dependent upon the radial position of said star in said optical field comprising a rotatable opaque disc having a transparent area bounded by a semicircle concentric with the axis of rotation of said disc, and a curve symmetrical about said axis of rotation and a second transparent area radially positioned outward from said semicircle so that the centroid of all transparent areas of said disc falls on said center of rotation whereby light from said star is modulated with a relative time phase dependent upon the radial position of said star within said field.

References Cited in the file of this patent

UNITED STATES PATENTS

| | | |
|---|---|---|
| 1,618,757 | Hoxie | Feb. 22, 1927 |
| 2,468,042 | Cranberg | Apr. 26, 1949 |
| 2,513,367 | Scott | July 4, 1950 |
| 2,525,147 | Nelson | Oct. 10, 1950 |